United States Patent [19]

Honore

[11] Patent Number: 5,551,065
[45] Date of Patent: Aug. 27, 1996

[54] WIRELESS SOLAR ENTERTAINMENT SYSTEM

[76] Inventor: David Honore, 26561 Sparks St., Highland, Calif. 92346

[21] Appl. No.: 358,296

[22] Filed: Dec. 19, 1994

[51] Int. Cl.$^6$ ..................................................... H04B 7/00
[52] U.S. Cl. .................................. 455/66; 455/89
[58] Field of Search ........................ 455/66, 89, 95, 455/100, 344, 350, 351; 381/77, 79, 80, 188, 205, 127

[56] References Cited

U.S. PATENT DOCUMENTS

| | | | |
|---|---|---|---|
| D. 256,360 | 8/1980 | Nishimoto | D14/198 |
| D. 315,561 | 3/1991 | Miller | D14/192 |
| 4,122,396 | 10/1978 | Grazier | 455/343 |
| 4,373,514 | 2/1983 | Lois | 126/583 |
| 4,731,870 | 3/1988 | Black et al. | 455/12 |
| 4,845,751 | 7/1989 | Schwab | 455/151.2 |
| 5,001,774 | 3/1991 | Lee | 455/151.1 |
| 5,012,220 | 4/1991 | Miller | 340/311.1 |
| 5,020,150 | 5/1991 | Shannon | 455/351 |
| 5,023,595 | 6/1991 | Bennett | 340/569 |

*Primary Examiner*—Reinhard J. Eisenzopf
*Assistant Examiner*—Marsha D. Banks-Harold
*Attorney, Agent, or Firm*—Our Pal(R) Asija

[57] ABSTRACT

This invention comprises a consumer electronics entertainment system with a transmitter and a wireless headphone receiver with matching frequency reception. It is particularly adapted for use by joggers, runners, walkers picnickers, sunbathers or other mobile users. The invention entails a transmission integrated solar powered cassette radio or CD ROM player or other portable consumer electronics entertainment device with a built in low range low power transmitter and wireless headphones that also operate on solar power with automatically solar charged back up battery that never needs replacement.

3 Claims, 4 Drawing Sheets

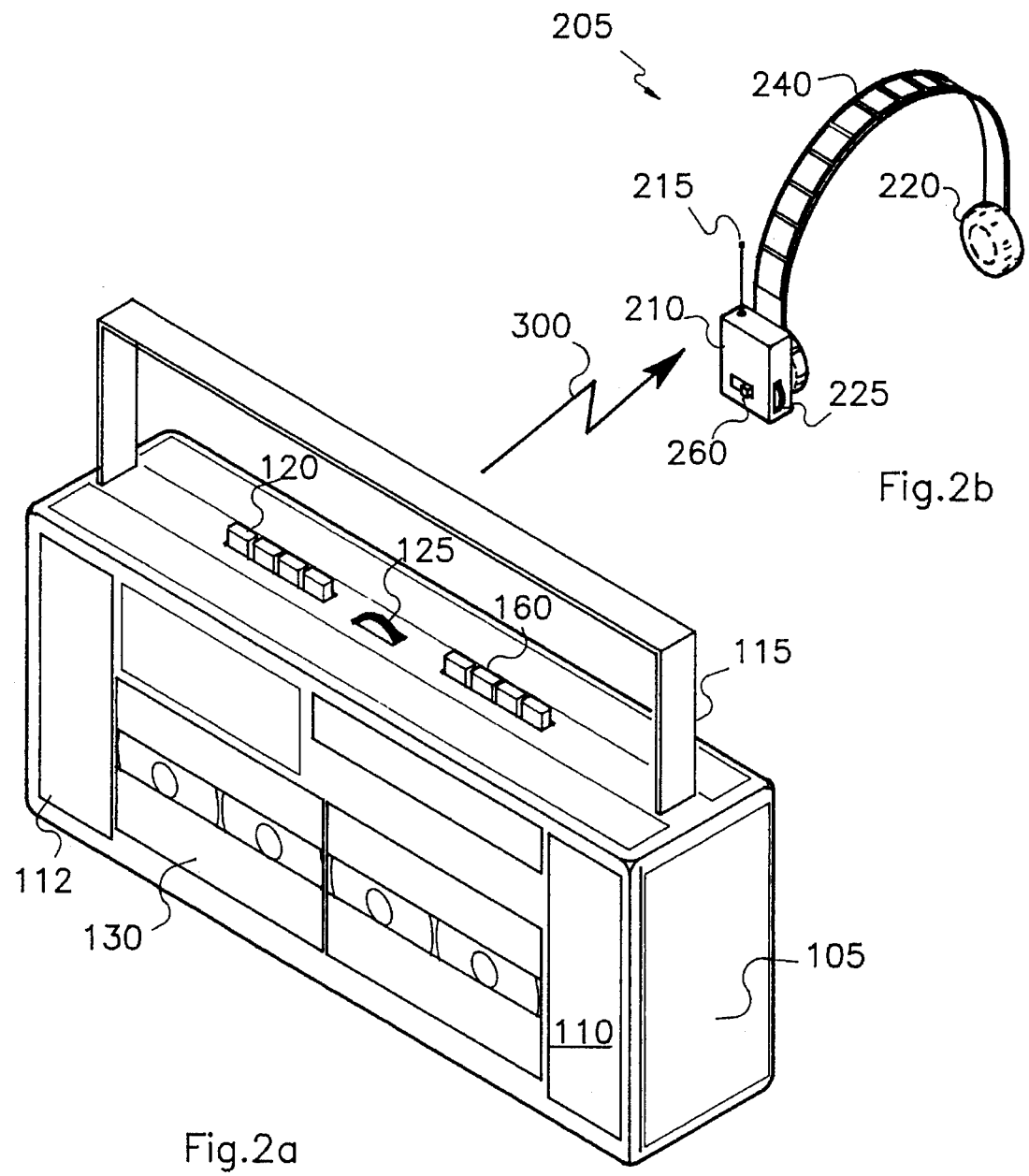

WIRELESS SOLAR ENTERTAINMENT SYSTEM

BACKGROUND

This invention relates to consumer electronics entertainment System which in turn comprises an entertainment unit, a transmitter unit and a receiver unit. The entertainment device can be a device such as integrated cassette recorder, player and radio. More particularly it comprises a wireless solar powered radio device with built in self recharging back up battery for use indoors or in shade. It is particularly adapted for use by joggers, runners, walkers picnickers, sunbathers or other mobile users. The invention comprises a consumer electronics entertainment device with a transmitter and a wireless headphone receiver with matching frequency reception etc.

THE PROBLEM

The problem with prior art devices such as a solar radio or cassette player is that they either operate in bright sun shine or they operate with battery which needs replacement from time to time. This invention solves that problem by incorporating into the cassette radio a solar charged back up battery, such that the device operates indoors as well as outdoors while obviating the need to replace batteries.

Another problem with prior art devices is that there is a wire link between the entertainment device such as cassette or a CDROM player and the headphones, which gets in the way of the user.

Furthermore a short range low power transmitter is included in the cassette radio or other consumer electronics entertainment device such that when the device is worn on the person such as a jogger around the waist etc.

The transmission is received and amplified by the wireless headphones by the user. Another purpose of this invention is to provide a transmission integrated device which performs multiple functions, operates in sunshine, light, shade or dark without need to replace batteries.

The prior art devices are cumbersome and expensive and not at all suited for small portable consumer electronics devices.

SUMMARY

This invention comprises a consumer electronics entertainment device with a transmitter and a wireless headphone receiver with matching frequency reception. It is particularly adapted for use by joggers, runners, walkers picnickers, sunbathers or other mobile users.

The invention entails a transmission integrated solar powered cassette radio or CD ROM player or other portable consumer electronics entertainment device with a built in low range low power transmitter and wireless headphones that also operate on solar power with automatically solar charged back up batter that never needs replacement.

It also includes a solar charged battery as a back up for use of the device such as a cassette recorder, player, CD ROM player or the like consumer electronics entertainment device indoors or in the shade or even in complete darkness.

The recharging is automatic. The rate of recharging is a function of the ambient light. The integrated radio cassette recorder and player has all of the conventional functions but additionally the ease provided by solar cells and concomitant solar charged back up battery. The device also includes a proximity sensor such that when no one is around to listen the device automatically shuts off to conserve and/or recharge battery and to diminish fatigue, wear and tear on electronics parts.

PRIOR ART

A preliminary prior art search was conducted and furthermore the inventor is intimately familiar with the problem and the prior art.

Following U.S. patents are typical example of the prior art attempting to solve the problem of providing music and information to joggers and transient workers outdoors. For the convenience of the reader these patents are arranged in the reverse chronological order.

a) U.S. Pat. No. 5,023,595 granted to Charles Bennett on Jun. 11, 1991 for "Mail Arrival Signal System"

b) U.S. Pat. No. 5,020,150 awarded to John Shannon on May 28, 1991 for, "Combination Radio & Eyeglasses"

c) U.S. Pat. No. 5,012,220 bestowed upon Moses Miller on Apr. 30, 1991 for "Solar Powered Paging Device"

d) U.S. Pat. No. D-315,561 invented by Moses Miller on Mar. 19, 1991 for, "Solar Powered Radio"

e) U.S. Pat. No. 5,001,774 conferred upon Kyu-An Lee on May 19, 1991 for, "Stereo Headphone Remote Control Circuit"

f) U.S. Pat. No. 4,845,751 honored upon Brian Schwab on Jul. 4, 1989 for "Wireless Stereo Headphone"

g) U.S. Pat. No. D-256,360 honorably given to Nishimoto et al on Aug. 12, 1980 for, "Solar Battery Powered Radio Receiver."

h) U.S. Pat. No. 4,122,396 honorably earned by Grazier et al on Oct. 24, 1978 for, "Stable Solar Power Source for Portable Electrical Devices."

Unfortunately none of the prior art devices singly or even in combination meet all of the objectives established by the inventor for the Wireless Solar Cassette Radio of this invention, which are enumerated below.

OBJECTIVES

1. It is an objective of this invention to provide a simple low cost wireless portable consumer electronics entertainment device.

2. Another objective of this invention is that it is particularly adapted for use by joggers, runner, walkers, picnickers, sunbathers and other portable mobile users.

3. Another objective of this invention is that it does not interfere with the normal use of the body functions of the user.

4. Another objective of this invention is that it can be adapted for other uses.

5. Another objective of this invention is that it is virtually indestructible.

6. Another objective of this invention is that there are no wires between the entertainment device and the headphones.

7. Another objective of this invention is that it be easily incorporable into OEM devices or marketable as a kit for the DIY consumer for attachment to existing devices.

8. Another objective of this invention is that it be environmentally safe.

9. Another objective of this invention is that it be physically safe, noise free and consume little or no energy.

10. Another objective of this invention is that it be easy to use even intuitive even for novice or first time users.

11. Another objective of this invention is that it meet all federal, state, local and other private standards guidelines, regulations and recommendations with respect to safety, environment, energy consumption.

12. Another objective of this invention is that it be ergonomically designed to avoid any side ill effects on the health of the users.

13. Another objective of this invention is that it be self contained complete with instructions.

14. Another objective of this invention is that it is solar powered backed by a solar charged battery such that it does not require any replacement of batteries and is operable in all light conditions.

15. Other objectives of this invention reside in its simplicity, elegance of design, ease of manufacture, service and use and even aesthetics as will become apparent from the following brief description of the drawings and the detailed description of the preferred embodiment.

BRIEF DESCRIPTION OF THE DRAWING

The objects, features and advantages of the present invention and its application will be more readily appreciated when read in conjunction with the accompanying drawing, in which:

c) FIG. 2(a) is an isometric perspective view of the lugable local cassette player complete with transmitter.

b) FIG. 2(d) is a perspective view of the combination receiver unit complete with built in receiver similar to that in FIG. 1(b) except that receiver is tuned to the radio frequency transmitted by lugable local cassette player of FIG. 2(a).

DETAILED DESCRIPTION OF THE PREFERRED EMBODIMENT

Figures 1A, 1B:
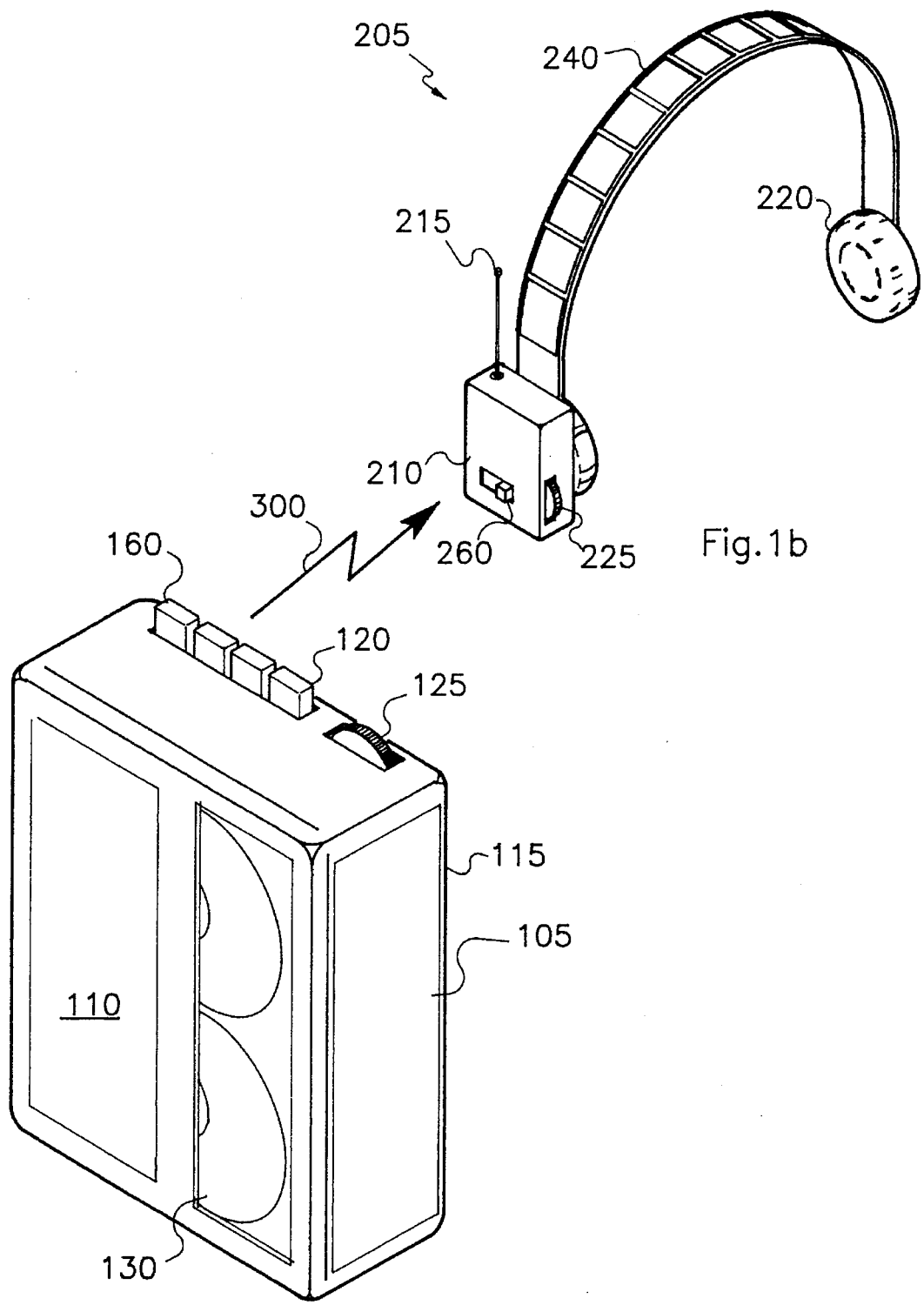
FIG. 1(a) is a perspective view of the portable personal cassette player and built in transmitter.
FIG. 1(b) is a perspective view of the combination receiver unit complete with built in receiver.

As shown in the drawings wherein like numerals represent like parts throughout the several views, there is generally disclosed a transmitter unit 100 having a low power low range transmitter 110 and antenna 115 and a wireless receiver unit 200 having a receiver 210 and an antenna 215 coupled or integrated into it.

The transmitting antenna 115 and receiving antenna 215 may be in the form of casing or handle to obviate a separate antenna sticking out. The main difference between the embodiments of FIGS. 1 and 2 is that the transmitting unit 100 in FIG. 1 is personal and is generally carried by the person in shirt pocket, belt etc.

In contrast the unit in FIG. 2 is not personal but local where the user places this unit in the vicinity (for example on the front porch or in the boat and then moves around and tends to other chores while listening to good music. For this reason the unit of FIG. 2(a) may also have optional speakers 112 in it so that the music from this local lugable base unit can be enjoyed without the aid of the receiver unit 200.

As shown in respective figures the base entertainment unit comprises a standard multi-function audio entertainment unit 105 combined with a remote headphone 205 link 300 and a power management subsystem 150.

The remote transmission link 300 operates on one of several selectable frequencies within the public service bands reserved for personal communications. This transmission signal 300 is frequency modulated by a standard format stereo signal, allowing the use of easily available components. The power management subsystem 150 uses an external power supply and/or a solar cell array 140 to maintain rechargeable battery pack 145 fully charged.

The remote headset unit 205 comprises a pair of headphones 220 driven by a fixed tuned stereo receiver 210 tuned to the same channel as the corresponding base entertainment unit transmitter.

The availability of multiple channels, coupled with the "Capture Effect" of FM transmissions, reduces the probability of interference from other similar units. The headset unit 205 also includes a power management sub-system 250 in order to maximize the operational life of the unit.

Figure 3:
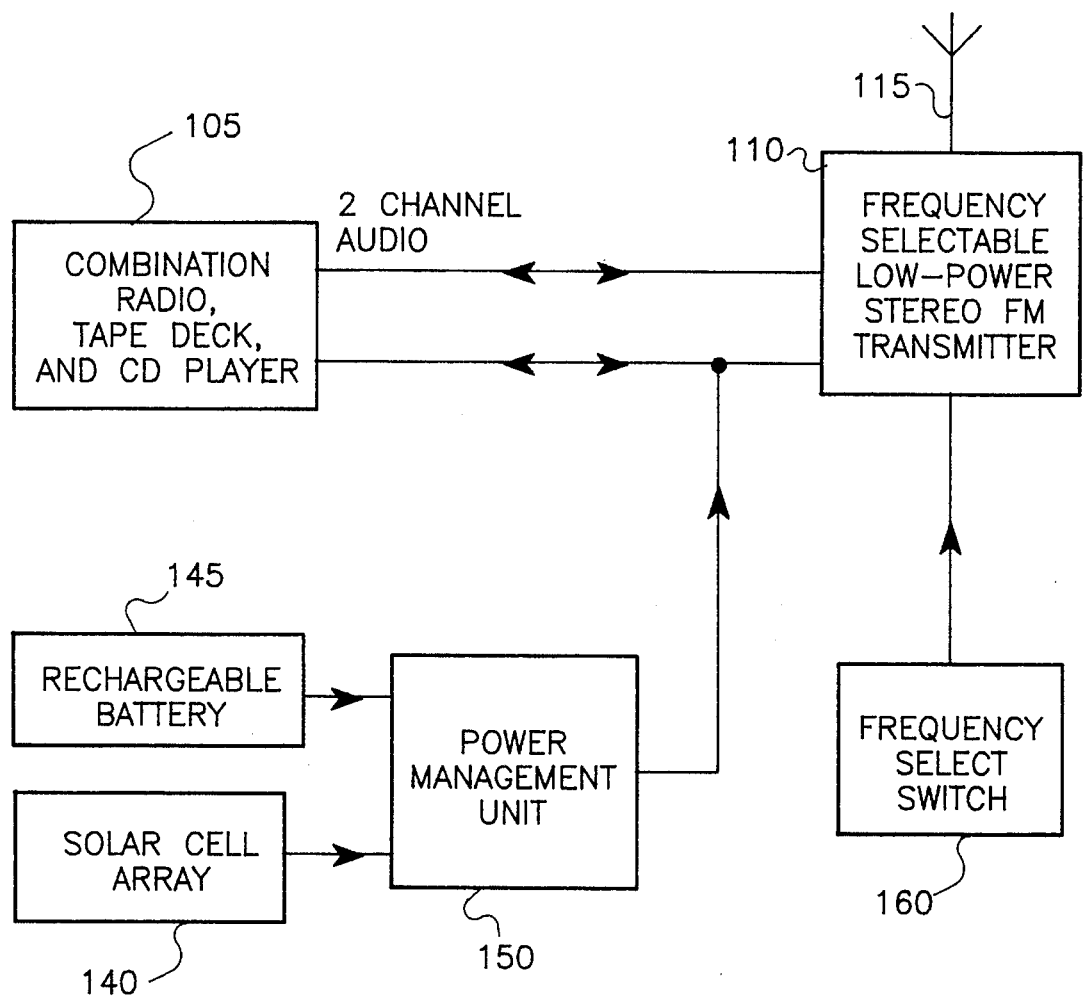
FIG. 3 is a block diagram of the transmitter unit.

As shown in FIG. 3 the transmitter unit 100 comprises an entertainment device 105 a transmitter 110 antenna 115, a solar cell array 140 and a rechargeable battery 145 which are connected to a power management unit 150.

A frequency select switch 160 permits changing the frequency of the transmission carrier signal 300 to obviate interference at a given frequency at a given time. This function in the alternative may be performed automatically.

Figure 4:
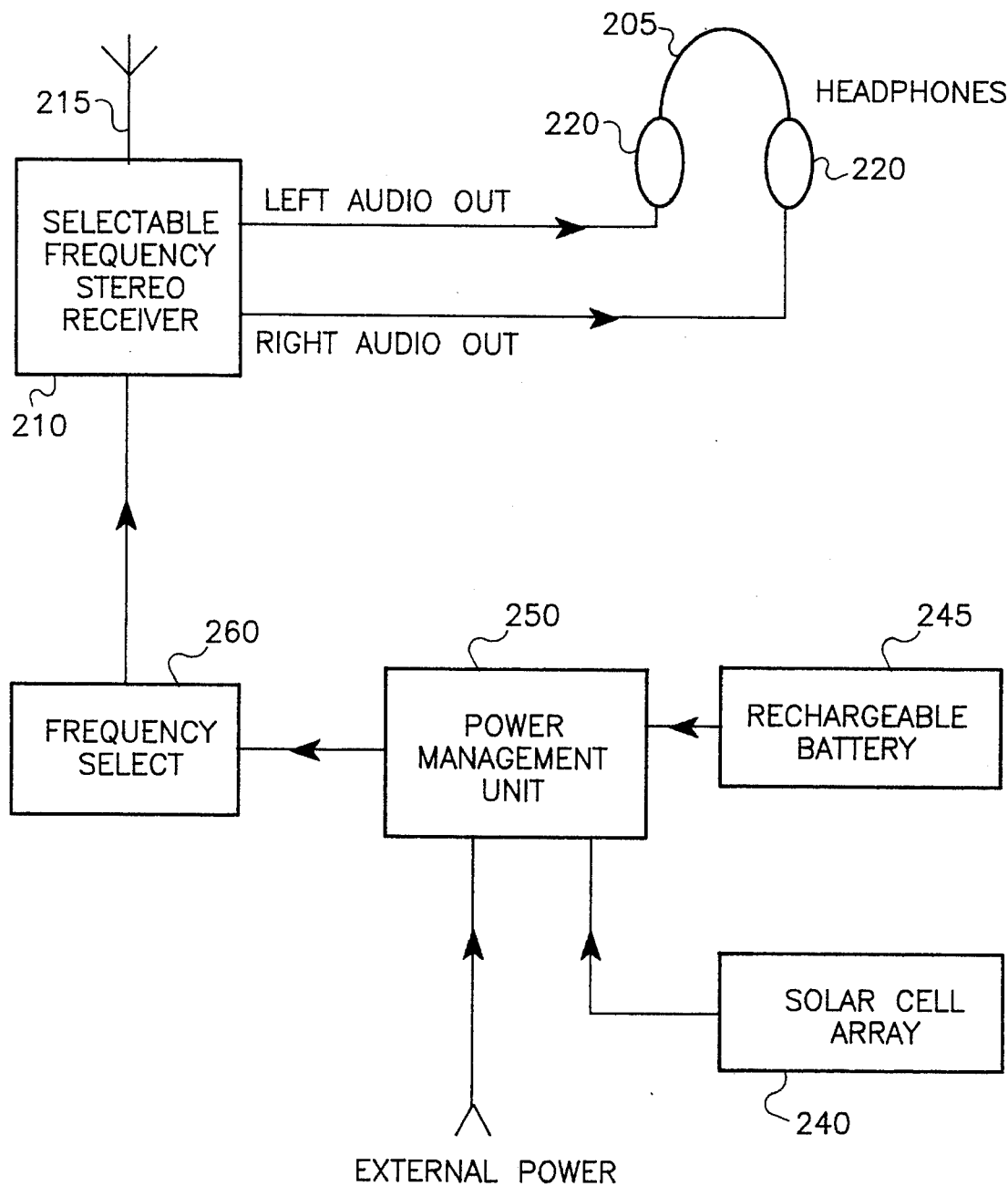
FIG. 4 is a block diagram of the receiver unit.

As shown in FIG. 4 the receiver unit 200 comprises an entertainment reception device 205 capable of receiving entertainment signals which can be simply a pair of left and right earphones 220 to preserve the stereo quality of sound, a receiver 210 and concomitant antenna 215, a solar cell array 240 and a rechargeable battery 245 which are connected to a power management unit 250.

A frequency select switch 260 permits changing the frequency of the received signal to correspond to the frequency of the transmission carrier signal 300 to obviate interference at a given frequency at a given time. This function in the alternative may be performed automatically.

OPERATION

The use and the operation of this invention is intuitive. The inventor has given a non-limiting description of the concept. Many changes may be made to this design without deviating from the spirit of the concept of this invention. Examples of such contemplated variations include the following.

a) The invention may be combined with other functions which complement each other with or without synergism., b) The system may be adapted for other related uses tangentially or remotely connected with consumer electronics, wireless headphones and solar powered devices.

c) A different type solar array may be used.

d) Instead of frequency modulation a different modulation or different public frequency may be used.

e) A switch may be incorporated to permanently disable or enable the solar energy source.

f) A different type of antenna may be used which may not be integrated into entertainment unit case or handle.

Other changes such as aesthetic and substitution of newer materials as they become available which substantially perform the same function in substantially the same way with substantially the same result without deviating from the spirit of this invention may be made.

DEFINITIONS

Great care has been taken to use words with their conventional dictionary definitions. Following definitions are included for here clarification.

Interface=Relationship between two dissimilar entities.

Transmitter=Unregulated low range low power transmitter

Receiver=Unregulated low range low power receiver.

CDROM=Compact Disc Read Only Memory

DIY=Do It Yourself

OEM=Original equipment Manufacturer

FM=Frequency Modulation

Capture Effect=a characteristic of FM transmissions that reduces interference.

Following is a listing of the components used in this embodiment arranged in ascending order of the reference numerals for ready reference of the reader.

100=Transmitter Unit.
105=Transmitter Entertainment Unit
110=Transmitter in said device 100
112=Optional speaker in entertainment unit
115=Transmitter Antenna as case
120=Entertainment device control buttons
125=Volume Control
130=Cassettes
140=Solar Cell Array
145=Rechargeable Battery
150=Power Management Unit
160=Frequency Select
200=Receiver Unit
205=Receiver Entertainment Device e.g., headphones
210=Receiver in receiver unit 200
215=Receiver Antenna
220=Earphones
240=Solar cell array in Receiver unit
245=Rechargeable Battery
250=Power Management Unit
260=Frequency Select Switch
300=Transmission Signal While this invention has been described with reference to illustrative embodiments, this description is not intended to be construed in a limiting sense. Various modifications and combinations of the illustrative embodiments as well as other embodiments of the invention will be apparent to persons skilled in the art upon reference to this description. It is therefore contemplated that the appended claims cover any such modifications, and/or embodiments that fall within the true scope of the invention.

The inventor claims:

1. A personal wireless solar entertainment system comprising:
    a) an entertainment device;
    b) a low range transmitter integrated into said entertainment device;
    c) a personal receiver unit tuned to said transmitter; and
    d) wherein said personal receiver unit comprises:
        (i) an entertainment receiver device;
        (ii) a receiver connected to said entertainment receiver device;
        (iii) a receive antenna connected to said receiver;
        (iv) a first frequency select switch connected to said receiver;
        (v) a first power management unit connected to said entertainment receiver device and said receiver;
        (vi) a first solar array cell connected to said first power management unit; and
        (vii) a first rechargeable battery connected to said first power management unit; and
    e) wherein said low range transmitter comprises:
        (i) a transmitter connected to said entertainment device;
        (ii) a transmitter antenna is connected to said transmitter;
        (iii) a second frequency select switch connected to said transmitter;
        (iv) a second power management unit connected to said entertainment device and said transmitter;
        (v) a second solar array cell connected to said second power management unit;
        (vi) a second rechargeable battery connected to said second power management unit; and
    f) wherein said receiver antenna is integrated into said entertainment receiver device; and
    g) said transmitter antenna is integrated into a handle of said entertainment device.

2. A personal wireless solar entertainment system comprising:
    a) a low power limited range transmitter device and a receiver device tuned to said transmitter device and wherein said transmitter device comprises;
    a) an entertainment device;
    b) a transmitter connected to said entertainment device;
    c) a transmitter antenna connected to said transmitter;
    d) a first frequency select switch connected to said transmitter;
    e) a first power management unit connected to said entertainment device and said transmitter;
    f) a first solar array cell connected to said first power management unit;
    g) a first rechargeable battery connected to said first power management unit; and wherein said receiver unit comprises:
    h) an entertainment receiver device;
    i) a receiver connected to said entertainment receiver device;
    j) a receive antenna connected to said receiver;
    k) a second frequency select switch connected to said receiver;
    l) a second power management unit connected to said entertainment receiver device and said receiver;
    m) a second solar array cell connected to said second power management unit;
    n) a second rechargeable battery connected to said second power management unit; and wherein
    o) said receiver antenna is integrated into said receiver device;

p) said transmitter antenna is integrated into a handle of said entertainment device; and q) wherein an automatic frequency select function is incorporated into said transmitter device and said receiver device to automatically select said first frequency select switch and said second frequency select switch to one and the same frequency.

3. A personal wireless solar entertainment system comprising:

a) a low power limited range transmitter device; and b) a receiver device tuned to said transmitter device;

c) wherein said transmitter device comprises:
   (i) an entertainment device;
   (ii) a transmitter connected to said entertainment device;
   (iii) a transmitter antenna connected to said transmitter;
   (iv) a first automatic frequency select switch connected to said transmitter;
   (v) a first power management unit connected to said entertainment device and said transmitter;
   (vi) a first solar array cell connected to said first power management unit; and
   (vii) a first rechargeable battery connected to said first power management unit; and d) wherein said receiver device comprises:
   (i) an entertainment receiver device;
   (ii) a receiver connected to said entertainment receiver device;
   (iii) a receive antenna connected to said receiver;
   (iv) a second automatic frequency select switch connected to said receiver;
   (v) a second power management unit connected to said entertainment receiver device and said receiver;
   (vi) a second solar array cell connected to said second power management unit; and
   (vii) a second rechargeable battery connected to said second power management unit; and wherein e) said transmitter antenna is integrated into said transmitter entertainment device in the form of a handle; and f) said receiver antenna is integrated into said receiver device in the form of a pair of headphones.

\* \* \* \* \*